(12) United States Patent
Seitz et al.

(10) Patent No.: US 7,901,001 B2
(45) Date of Patent: Mar. 8, 2011

(54) SUPPORTING STRUCTURE FOR THE CONSOLE OF A MACHINE TOOL

(75) Inventors: Reinhold Seitz, Hopferau (DE); Karl Lechleiter, Oy-Mittelberg (DE); Dominic Schindler, Lauterach (AT)

(73) Assignee: Deckel Maho Pfronten GmbH, Pfronten (DE)

(*) Notice: Subject to any disclaimer, the term of this patent is extended or adjusted under 35 U.S.C. 154(b) by 213 days.

(21) Appl. No.: 12/140,140

(22) Filed: Jun. 16, 2008

(65) Prior Publication Data
US 2009/0020679 A1 Jan. 22, 2009

(30) Foreign Application Priority Data
Jun. 14, 2007 (DE) .............. 20 2007 008 317 U

(51) Int. Cl.
*B23Q 15/00* (2006.01)
(52) U.S. Cl. .............. 297/217.7; 297/174 R; 297/217.1; 297/217.3; 297/452.39
(58) Field of Classification Search .............. 297/14, 297/170, 172, 174 R, 217.1, 217.3, 217.7, 297/452.39; 108/44; 224/509, 519–521, 224/524
See application file for complete search history.

(56) References Cited

U.S. PATENT DOCUMENTS

| | | | | |
|---|---|---|---|---|
| 5,575,521 A * | 11/1996 | Speis | .......................... | 296/57.1 |
| 5,833,308 A * | 11/1998 | Strong et al. | .................. | 297/172 |
| 6,085,954 A * | 7/2000 | Bloemer et al. | .............. | 224/509 |
| 6,129,371 A * | 10/2000 | Powell | ........................ | 280/461.1 |
| 6,189,458 B1 * | 2/2001 | Rivera | ........................... | 108/44 |
| 6,269,578 B1 * | 8/2001 | Callegari | ....................... | 297/172 |
| 6,739,269 B1 * | 5/2004 | Benton | ........................... | 108/44 |
| 6,935,064 B1 * | 8/2005 | Thompson | ....................... | 42/94 |
| 7,152,358 B1 * | 12/2006 | LeAnna et al. | .............. | 297/170 |

FOREIGN PATENT DOCUMENTS

| | | |
|---|---|---|
| DE | 7016294 | 11/1976 |
| DE | 202044488 U1 | 8/2002 |
| DE | 202004007556 U1 | 8/2004 |
| DE | 202005020066 U1 | 3/2006 |

* cited by examiner

*Primary Examiner* — Peter R. Brown
(74) *Attorney, Agent, or Firm* — The Maxham Firm

(57) ABSTRACT

A supporting structure for the console of a machine tool comprising a bending-resistant supporting beam pivotably mounted on the base of the machine tool with its machine-side end and carrying a console comprising a keyboard and a display unit on the free end of its portion directed transversely upward.

30 Claims, 2 Drawing Sheets

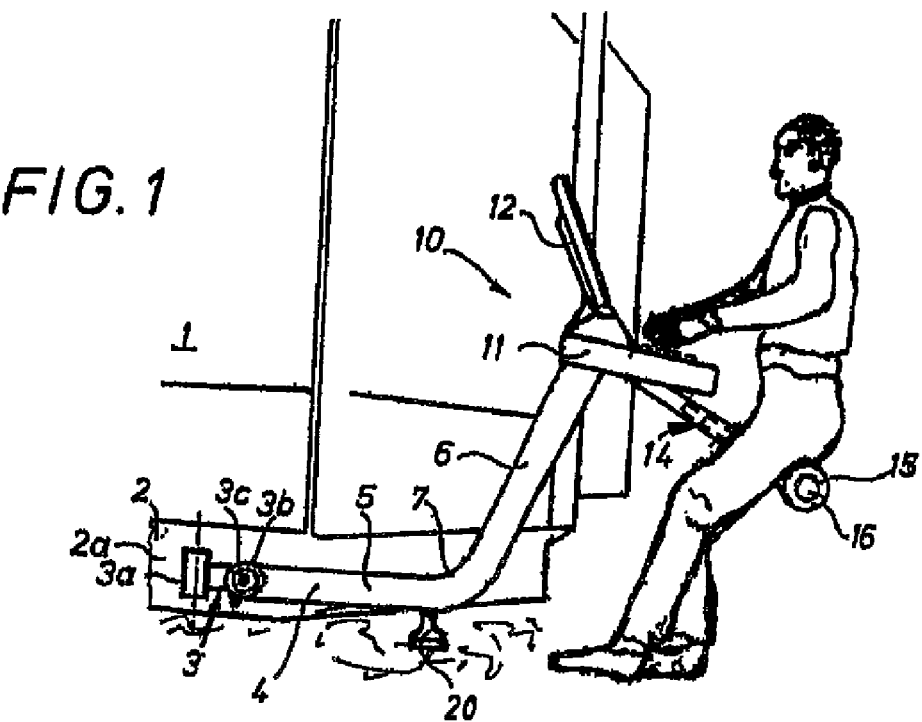
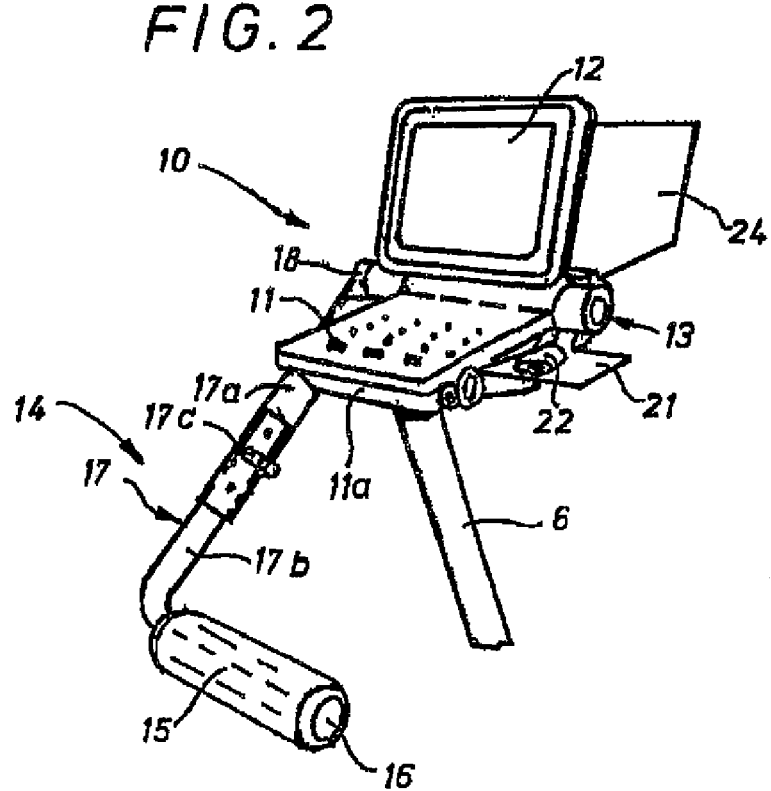

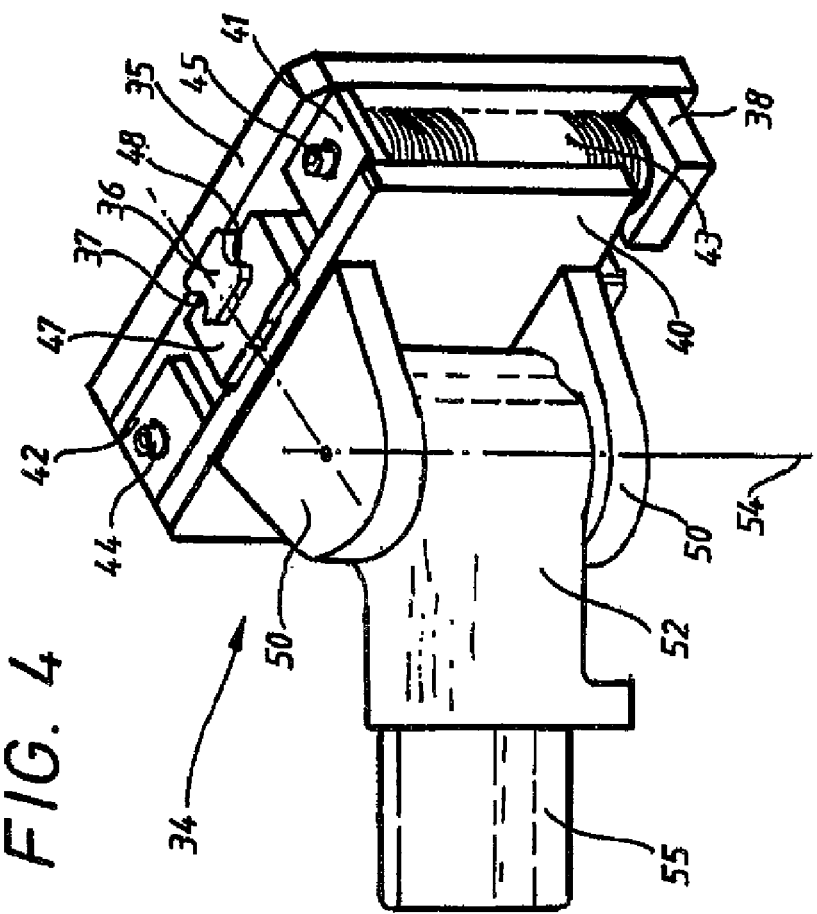

SUPPORTING STRUCTURE FOR THE CONSOLE OF A MACHINE TOOL

FIELD OF THE INVENTION

The invention relates to a supporting structure for the console of a machine tool comprising a bending-resistant supporting beam pivotably mounted on the base of the machine tool with its machine-side end and carrying a console comprising a keyboard and a display unit on the free end of its portion directed transversely upward.

DISCUSSION OF PRIOR ART

Program controls of recent machine tools and machining centers for machining workpieces generally comprise an input station in the form of a console which is either attached to a stationary component of the machine, for example, a side wall of the protective cabin, or mounted to the free end of a relatively long supporting beam. Important constituents of the console are regularly a keyboard and a display unit, generally a display screen disposed on the rear end of the keyboard in a predetermined fixed inclination and fixedly connected to the housing of the keyboard. The arrangement of the console on the free end of the supporting beam pivotable in the horizontal direction is advantageous in that the operator can move the console to the respectively suitable position in accordance with the work he is to perform.

The work and the machining processes to be performed by program-controlled machine tools are frequently highly complex and sometimes require programming work of several hours to be performed by the operator. It has been found that the power of concentration of the programmers decreases in the course of longer-lasting programming work if this time-consuming work is carried out while standing. If the programmer leans on the console or its key panel or keyboard due to certain symptoms of fatigue the weight then applied by him is transferred to the machine base as moments in an amplified manner via the relatively long supporting beam. Said loads acting on the machine base or machine stand may result in machining inaccuracies and in inadmissibly large tolerances in case of high precision work.

SUMMARY OF THE INVENTION

It is a purpose of the invention to provide a supporting structure for the console of a machine tool enabling a more comfortable position of the programmer in connection with a constantly good accessibility of the console and preventing adverse effects on the operating behaviour of the machine tool, particularly on its machining accuracy.

According to embodiments of the invention, the purpose is achieved by a seat member for the programmer being provided on the supporting beam or on the console via a support and at least one supporting leg arranged on the approximately horizontal, machine-side portion of the supporting beam and transmitting vertical loads of the supporting beam to the floor.

With the provision of a seat member according to the invention the programmer obtains the option to take a more comfortable, selectable seated position in case of longer-lasting programming work. With the arrangement of the seat member including its support on the upper portion of the supporting beam or on the console the operator gains a less fatiguing access to the keyboard then disposed in an ergometric position and can track the corresponding processes on the screen without trouble. To prevent the weight of the seated programmer from being fully transmitted to the machine stand or the machine base via the support of the seat member and via the relatively amply protruding elongated supporting beam the supporting leg on the bottom side of the supporting beam is preferably arranged at the end of its horizontal machine-side portion.

To carry out horizontal, lateral pivoting movements of the supporting beam a predetermined distance between the floor and the supporting leg is maintained so that a sliding of the supporting leg on the floor or other collisions are avoided while pivoting. Advantageously the supporting leg may, in its projecting length, be adjustably fixed to the stable supporting beam, for example by means of a screw thread. It is also possible to movably connect the supporting leg to the supporting beam so that it can be moved into an active supporting position from a stand-by position by the operator when the supporting beam has been pivoted into its desired position.

According to an advantageous embodiment of the invention a bearing arrangement via which the supporting beam is connected to the machine base so as to be movable in a plurality of axes is provided between a near-floor portion of the base of the machine and the machine-side end of the supporting beam. That bearing arrangement provided with spring elements enables pivoting movements of the supporting beam in the horizontal direction about a normal axis of a rotary bearing as well as limited vertical movements of the supporting beam until the supporting leg rests on the floor. The bearing arrangement may be embodied in different variants and enables movements of the supporting beam in or about at least two axes, that is, horizontal pivoting movements about the vertical normal axis of a first bearing and, in addition, limited vertical movements.

In one embodiment the bearing arrangement comprises a first bearing acting as a rotary bearing for horizontal pivoting movements of the supporting beam about a normal axis as well as a second bearing mechanically coupled to the first bearing and provided for minor and limited pivoting movement about a horizontal axis or rotation.

Another embodiment of the bearing arrangement comprises a first bearing acting as a rotary bearing for the horizontal pivoting movements of the supporting beam about a normal axis as well as a linear or travelling bearing permitting relative vertical movements between machine-side end portion of the supporting beam and the base of the machine tool. Such bearing arrangement results in a high bending and twisting resistance of the entire supporting structure and avoids undesirable convolutions of the supporting beam which might lead to inclinations of the console mounted to its end side. Conveniently this embodiment of the bearing arrangement may comprise relatively rigid spring elements and non-tilting and non-jamming profiled rail guides permitting short movements of the supporting beam in the vertical direction but prevent torsion along the longitudinal axis and twisting.

In the bearing arrangements formed according to an embodiment of the invention the vertical movements of the supporting beam only bridge the free space amounting to only a few centimeters between the supporting leg and the floor when the operator has sat down on the seat member. The supporting leg is, in this instance, in its previously adjusted supporting position and contacts the floor in the final stage of the vertical pivoting movement of the supporting beam. The weight of the seated programmer acting on the supporting beam is, in this way, preferably applied to the floor by the supporting leg. On this occasion the position of the supporting leg is preferably selected on the end of the horizontal portion of the supporting beam so that the moments resulting from the weight can be absorbed by the respective bearing arrangement of the supporting beam on the machine base.

The seat member used in the supporting structure according to the invention should have an ergonomically favourable shape, and it should be formed of elastically deformable materials, for example, synthetic polyesters, to counteract an exhaustion of the seated operator. Advantageously the seat member is a seat frame pivotably hinged to the console, the supporting pole of the seat frame being hinged to the upper portion of the supporting beam or to the support of the console and its angled end portion bearing a cylindrical upholstery element. The supporting pole supported in a bearing allocated to the console with its upper end can be adjusted to a comfortable inclined position by the operator and locked in the desired position by operating a locking mechanism.

According to another advantageous embodiment of the invention the seat element is kinematically connected to a locking means provided in the respective bearing arrangement via, for example, electric or fluidic lines and switching members, the locking means being released when the seat member is loaded by the operator.

According to another advantageous embodiment of the invention the supporting beam is formed as a hollow profile comprising continuous longitudinal passages for accommodating the control cables for maintaining a high bending resistance in case of a low weight. Conveniently extruded aluminium profiles are used which may have a partially elliptic outer contour and comprise a plurality of radial, longitudinally continuous stiffening fins. A cable passage opened toward the radially outer side may be covered by a thin-walled covering element connected to the hollow profile via catches on both sides.

BRIEF DESCRIPTION OF THE DRAWING

Further advantages and particularities of the supporting structure according to the invention can be derived from the following detailed description in conjunction with the drawing, in which:

FIG. 1 is a schematic perspective view of a supporting structure according to the invention, including a programmer sitting at a console on the protective cabin of a machine tool;

FIG. 2 shows a schematic representation of a console including a seat member of FIG. 1;

FIG. 3 is a cross section of a supporting beam of FIG. 1;

FIG. 4 is a schematic perspective representation of an embodiment of a bearing arrangement used in the FIG. 1 structure.

DETAILED DESCRIPTION OF THE PREFERRED EMBODIMENTS

With reference now to the drawing, and more particularly to FIG. 1, there is shown a schematic side view of part of protective cabin 1 and base 2 of a machine tool resting on the floor on feet (not shown). The supporting structure according to the invention, which is described in detail below, may be used for various machine tool types, for example, for lathe machines, milling and drilling machines, grinding machines or the like, as well as for corresponding machining centers. The supporting structure is intended to support a console which may be embodied in different variants. The console illustrated in the drawing and described below is a novel and particularly advantageous embodiment as compared to known consoles.

On a side surface of base 2 of the illustrated milling and drilling machine beyond which protective cabin 1 protrudes, bearing arrangement 3 is provided which constitutes a part of the supporting structure according to the invention and is formed as a double-joint bearing arrangement 3a, 3b in the embodiment shown in FIG. 1. On side wall 2a of base 2 a first bearing 3a is fixedly mounted which acts as a rotary bearing and permits rotary motions of supporting beam 4 about the vertical normal axis represented by a dot-chain-line. First bearing 3a is connected to second bearing 3b permitting rotational motions about its horizontal central axis via double bridges or braces. In second bearing 3b, spring 3c formed as a torsion rod or torsion spring is installed. Further a positive or negative type locking mechanism in the form of, for example, spring loaded pivots, wedges, or the like, which may be activated or released by manipulating electro-mechanical or fluidic switching elements, is provided in the second bearing. Second bearing 3b is fixed by activating this locking mechanism so that movements about the horizontal central axis may be prevented. After having released the locking mechanism by manipulating a switching element, rotational movements may be carried out and torsion spring 3c then is activated to dampen such movements.

In the bearing arrangement illustrated as a first embodiment in FIG. 1 an inherently stable supporting beam 4 is mounted on the rotating member of second bearing 3b, the supporting beam preferably consisting of a hollow profile, which may be round or elliptical or angular on the outer side. In the present embodiment, the two-joint bearing arrangement enables narrowly limited vertical movements of supporting beam 4 about the horizontal axis of second bearing 3b against the dampening force of torsion spring 3c installed in the second bearing by means of the combination of first and second bearings 3a, 3b. The function of first bearing 3a enables larger horizontal pivoting movements of supporting beam 4 about the vertical axis of the first bearing to move the console mounted to the free end of the supporting beam into the work position desired by the operator.

In the embodiment shown in FIG. 1 supporting beam 4 comprises a straight machine side portion 5 attached to bearing arrangement 3 on its end side and blending into a beam section 6 directed transversely upwardly via arc or angle portion 7. Console 10, including keyboard 11 and display unit 12 comprising a flat screen, is attached to the free end of straight beam section 6 directed upwardly. Beam section 6 directed transversely upwardly is positioned at and attached to the rear part of flat rectangular housing 11a (see FIG. 2) of keyboard 11 on its bottom side so that a sufficiently large free space for the legs of an operator is obtained under the keyboard housing (see FIG. 1).

Keyboard 11 or its housing 11a of console 10 can be formed as an integral assembly together with display unit 12, that is, together with the flat screen and its housing. In this embodiment the inclination of display unit 12, that is, of the flat screen, cannot be changed. In case of console 10 shown in FIG. 2, however, display unit 12 is connected to the rear edge of keyboard 11 via continuous hinge 13 so that the display unit, including the screen, can be positioned in an appropriate inclination in space and adjusted with respect to the keyboard. To prevent unintended and undesired adjustments of display unit 12 which may be caused by oscillations and vibrations during the operation of the machine tool, an appropriate locking mechanism comprising, for example, indexing elements, clamps, or the like, and operable by the operator after the adjustment of the optimum screen position, is provided in hinge 13.

To limit the symptoms of fatigue of the operator which might possibly occur during time-consuming programming work seat support 14 is provided on which the operator may take a seat-like position as shown in FIG. 1. Seat support 14 includes seat upholstery 15 which may be formed as a sheathed foamed plastic cylinder in the embodiment shown. Seat upholstery 15 is non-rotatably mounted on angular horizontal end portion 16 of supporting pole 17. The angular end portion, and thus seat upholstery 15, are positioned in front of and under keyboard 11 so that the operator sits in front of the keyboard and the screen.

Horizontal end portion 16 blends into a straight or possibly arcuate supporting pole 17 via an angle or arc. To enable an adjustment of the height of seat upholstery 15 in correspondence with the body height of the operator the length of supporting pole 17 is adjustable. In the embodiment shown supporting pole 17 is telescopic and formed of upper pole section 17a as well as lower pole section 17b guided therein so as to be longitudinally shiftable and blending into horizontal end portion 16 via the arc. The two supporting pole sections 17a and 17b may be mutually locked in selected relative positions by means of an indexing bolt 17c or the like.

As can be seen in FIGS. 1 and 2, supporting pole 17 or, in the illustrated embodiment, upper supporting pole section 17a, may optionally be disposed on the left and/or right sides of console 10. In the embodiment according to FIG. 1 supporting pole 17, as viewed from the front, is pivotably arranged on the right side of the console. In the embodiment shown in FIG. 2 the supporting pole extends on the left side of the console, the seat upholstery 15 being disposed directly in front of the console in both cases. This freely selectable, lateral arrangement of the supporting pole and therefore the seat upholstery enables a simple adjustment of the positioning of the console to different machine types and operating locations.

Bearing element 18 is supported on a horizontal bearing bolt so as to be rotatable about the axis of hinge 13, and is arranged on the free end of upper pole section 17a. Supporting pole 17 and thus seat support 15 as well can be pivoted to a stand-by position pivoted toward supporting beam section 6 from an illustrated operating position via bearing element 18. A locking mechanism which may comprise positive locking elements such as spring loaded or fluidically or electromagnetically operable indexing bolts or negative clamping elements is allocated to the bearing arrangement formed of bearing element 18 and the bearing bolt or the like. Conveniently, such locking mechanism is formed so that it is automatically activated to fix seat upholstery 15 in the adjusted position if a load is applied to the seat upholstery 15 by the user after a small pivoting movement.

When the programmer takes the seated position on seat upholstery 15, as shown in FIG. 1, a part of his weight is transferred from the seat upholstery to supporting beam 4 via supporting pole 17. To minimise the effects of the weight on the machine base a supporting leg 20 is provided on the lower surface of the horizontal portion of supporting arm 4 in the area of arc 7 in the embodiment according to FIG. 1. In the illustrated embodiment the protruding length of supporting leg 20 is, for example, adjustable by being screwed in or out. The supporting leg is stable and fixed in place after a pre-adjustment. In other embodiments, however, the supporting leg may also be movably mounted on supporting beam 4 so that it may be moved into a stand-by position from an active operating position.

In the illustrated embodiment a predetermined gap of some 10 mm is present between the floor and supporting leg 20 when no load is applied to the seat member so that the supporting beam and hence console 10 can be freely pivoted by means of first bearing 3a about its normal axis in the horizontal plane in the bearing arrangement shown in FIG. 1 without supporting leg 20 touching the floor or sliding on it. In this state the lock in second bearing 3b is activated so that the horizontal posture and orientation of supporting beam 4 is maintained during a pivoting movement and supporting leg 20 will not contact the floor. The operator can work on the console 10 in a standing posture.

If the operator sits down on seat upholstery 15 in the manner shown in FIG. 1, supporting pole 17 is pivoted by a small amount of a few degrees by his weight. Such pivoting movement activates a switch which may, for example, be disposed in keyboard housing 11a or on hinge 13. That switch releases the lock in second bearing 3b by means of fluidic, electromagnetic, or mechanical means in the bearing arrangement shown in FIG. 1 so that supporting beam 4 can be vertically pivoted until supporting leg 20 rests on the floor. To avoid an abrupt occurrence of this slight pivoting movement it is dampened by the action of the torsion bar or torsion spring 3c built into second bearing 3b. Here the locking mechanism on the keyboard housing or hinge 18 is activated so that seat upholstery 15 is fixed in its pre-selected position.

The supporting structure according to the invention comprising seat upholstery 15 and the support of supporting pole 4 is designed for different consoles. A universally usable new console is shown in FIG. 2. Keyboard housing 11a mounted on the upper end of supporting beam section 6 directed transversely upward comprises the bearing arrangement formed by hinge 13 on which display unit 12 is arranged so as to be angularly adjustable at its rear edge. A locking mechanism operable by the operator and disposed on or in hinge 13 enables a fixation of the display unit in a desired inclination. On the (as viewed from the front) right side of the keyboard support plate 21, serving as a support for a computer mouse 22, is pivotably arranged on the hinge. Further, another plate 24 usable as a writing pad or note bracket is pivotably supported by hinge 13.

For obtaining the required high bending resistance in case of a low weight supporting pole 4 is formed as a hollow profile preferably consisting of a light metal which enables the laying of the required control cables. A particularly suitable embodiment of said hollow profile for supporting beam 4 is shown in a cross sectional view in FIG. 3. The supporting beam consists of an extruded aluminium profile including a partly elliptical outer contour and cable passage 26 provided in its lower portion according to FIG. 3. A thin-walled covering element 27 having an arcuate cross section is fixed by a simple catch connection and covers cable passage 26 opened to the outside. In the cable passage various cables 28, 29 are arranged. For obtaining a high stiffness and thus a correspondingly high load bearing capacity, internal stiffening fins 30 are provided in the hollow profile which extend in different radial directions and therefore ensure a high bending resistance against loads acting in different directions. Two of central bridges or fins 30 each comprise an eye having a central orifice for accommodating fixation screws (not shown).

FIG. 4 shows another embodiment of a bearing arrangement 34 integrated in a supporting structure according to the invention. This arrangement is particularly advantageous when the supporting construction is used without a support of the supporting beam 4 on the floor. Bearing arrangement 34 comprises a relatively thick-walled, in this case rectangular, stable back plate 35 installed in a near-floor section on base 2 of the machine by means of suitable fixation elements like, for example, screws, bolts of the like. On the front side of plate 35 guiding elements 36, which may consist of a continuous guide rail or of a plurality of guiding blocks inserted into the vertical groove 37 above each other, are fixed in vertical groove 37 in the central section. Further two lateral support plates 38 (only the right support plate 38 of which is shown in FIG. 4) are fixed to the front side in the lower section of plate 35.

A high strength support plate 40 is arranged plane-parallel to and opposite of back plate 35, two rear support plates 41, 42 oriented in axial alignment with lower support plates 38 being mounted on the upper lateral portions of support plate 40. Between the two lower support plates 38 and the two upper support plates 41, 42 a relatively stiff spring element 43 is clamped, respectively, which is a helical spring, respectively, in the embodiment shown in FIG. 4. In this view only the right spring element is visible. For fixing and adjusting the biasing force or spring stiffness of helical springs 43 studs 44, 45 are provided. Between the two spring elements 43 at least one guiding shoe 47 is mounted on the backside of support plate 40, the guiding shoe having vertical recess 48 in which stationary guiding element 36 is accommodated and guided so as to be vertically shiftable.

On the front side of support plate 40 two horizontal bearing plates 50 are fixed in a vertical distance to each other. In the space between these bearing plates an end piece 52 is supported so as to be pivotable about axis 54, the profiled shoulder 55 of end piece 52 being inserted into the open end of supporting beam 4.

In the bearing arrangement described above with reference to FIG. 4 distortions of the support structure about the longitudinal extension of supporting beam 4 and the resulting inclinations of console 10 are reliably avoided even in case of applications in which the supporting beam is not resting on the floor. Support plate 40 is vertically shiftable with respect to the plate 35 fixed to the machine together with the pivot bearing 50, 52, a support from both sides being ensured via the stiff helical springs 43 and a non-tilting and non-jamming linear movement being ensured via guides 36, 37, 47, 48.

The invention is not limited to the illustrated embodiment described above. The supporting beam may, for example, be assembled from conventional profiled elements formed by bending. Further a guiding roller may be provided on the supporting leg as a supporting element. The supporting structure according to the invention is suitable for use in various machine tools, particularly in milling machines, turning lathes, grinding machines as well as the corresponding machining centers.

What is claimed is:

1. A supporting structure which is adapted to be mounted to a machine tool and which supports a console thereon, the supporting structure comprising:
    a bending-resistant supporting beam having a proximal end and a distal end, the proximal end of said supporting beam being pivotably mountable on one side of the machine tool via a joint, said supporting beam carrying the console which comprises a keyboard and a display unit on said distal end of said supporting beam, said distal end of said supporting beam being inclined upwardly; and
    a seat structure in operative relationship to and spaced from said console, said seat structure being coupled to the distal end of said supporting beam and inclined downwardly from the distal end for supporting an operator.

2. The supporting structure according to claim 1, wherein, said joint comprises a bearing arrangement comprising a first bearing and a second bearing and being mechanically couplable between a proximal end of the machine tool and said supporting beam.

3. The supporting structure according to claim 2, wherein said bearing arrangement has two joints, said two joints respectively comprising said first bearing and said second bearing, said second bearing comprising a spring element and a locking mechanism.

4. The supporting structure according to claim 3, wherein said first bearing of said bearing arrangement comprises a rotary bearing for horizontal pivoting movements of said supporting beam, said second bearing comprising a linear bearing for vertical shifting movements of said bearing arrangement.

5. The supporting structure according to claim 4, wherein the bearing arrangement further comprises two lateral support springs and a central linear guide.

6. The supporting structure according to claim 2, wherein said first bearing of said bearing arrangement comprises a rotary bearing for horizontal pivoting movements of said supporting beam, said second bearing comprising a linear bearing for vertical shifting movements of said bearing arrangement.

7. The supporting structure according to claim 6, wherein the bearing arrangement further comprises two lateral support springs and a central linear guide.

8. The supporting structure according to claim 6, wherein said seat structure comprises a seat upholstery, adjusting means and locking mechanism, whereby the seat upholstery is adjustable to and lockable in various positions.

9. The supporting structure according to claim 2, wherein said seat structure comprises a seat upholstery, adjusting means and locking mechanism, whereby the seat upholstery is adjustable to and lockable in various positions.

10. The supporting structure according to claim 9, wherein said seat upholstery is non-rotatably fixed on an arcuate seat frame connected to a pivotable supporting pole hinged to an upper straight section of said supporting beam and lockable in a selected seat position.

11. The supporting structure according to claim 10, wherein said bearing arrangement has two joints and comprises a first bearing and a second bearing having a torsion spring element and a locking mechanism, said seat upholstery being coupled to said bearing arrangement via said supporting beam so that said locking mechanism in said bearing arrangement is released in case of a load acting on said seat upholstery.

12. The supporting structure according to claim 1, wherein said seat structure comprises a seat upholstery, adjusting means and locking mechanism, whereby the seat upholstery is adjustable to and lockable in various positions.

13. The supporting structure according to claim 12, wherein said seat upholstery is non-rotatably fixed on an arcuate seat frame connected to a pivotable supporting pole hinged to an upper straight section of said supporting beam and lockable in a selected seat position.

14. The supporting structure according to claim 13, wherein the length of said supporting pole is adjustable.

15. The supporting structure according to claim 12, and further comprising at least one supporting leg introducing the weight forces applied by the sitting operator into the floor is provided on a generally horizontal section of said supporting beam, wherein said supporting leg is displaceable from a stand-by position to an active supporting position by applying a load to said seat upholstery.

16. The supporting structure according to claim 1, wherein said supporting beam has a rounded cross-section and comprises longitudinally continuous stiffening fins as well as at least one covered cable passage provided in its interior.

17. A supporting structure which is adapted to be mounted to a machine tool and which supports a console thereon, the supporting structure comprising:

a bending-resistant supporting beam configured to be pivotably mounted at one end on one side of the machine tool via a joint, said supporting beam carrying the console which comprises a keyboard and a display unit on another end of said supporting beam which is upwardly inclined;

wherein said joint comprises a bearing arrangement comprising a first bearing and a second bearing and being mechanically couplable between of said machine tool and said one end of said supporting beam, wherein said bearing arrangement has two joints, said two joints comprising said first bearing and said second bearing, said second bearing comprising a spring element and a locking mechanism;

a seat structure in operative relationship to and spaced from said console, said seat structure being coupled to said supporting beam; and at least one supporting leg introducing the weight forces applied by the sitting operator into the floor is provided on an approximately horizontal section of said supporting beam.

18. The supporting structure according to claim 17, wherein said first bearing of said bearing arrangement comprises a rotary bearing for horizontal pivoting movements of said supporting beam, said second bearing comprising a linear bearing for vertical shifting movements of said bearing arrangement.

19. The supporting structure according to claim 18, wherein the bearing arrangement further comprises two lateral support springs and a central linear guide.

20. The supporting structure according to claim 17, wherein said first bearing of said bearing arrangement comprises a rotary bearing for horizontal pivoting movements of said supporting beam, said second bearing comprising a linear bearing for vertical shifting movements of said bearing arrangement, wherein the bearing arrangement further comprises two lateral support springs and a central linear guide.

21. The supporting structure according to claim 20, wherein said seat structure comprises a seat upholstery, adjusting means and locking mechanism, whereby the seat upholstery is adjustable to and lockable in various positions.

22. The supporting structure according to claim 17, wherein said supporting beam is at least partially hollow and has a rounded cross-section and comprises longitudinally continuous stiffening fins as well as at least one covered cable passage provided in its interior.

23. A supporting structure which is adapted to be mounted to a machine tool and which supports a console thereon, the supporting structure comprising:
a bending-resistant supporting beam having a proximal end and a distal end, said supporting beam being pivotably mountable on one side of the machine tool via a joint, said supporting beam carrying the console which comprises a keyboard and a display unit on said distal end of said supporting beam which is upwardly inclined;
a seat structure for an operator coupled to said supporting beam, wherein said seat structure comprises a seat upholstery, adjusting means and locking mechanism, whereby the seat upholstery is adjustable to and lockable in various positions and wherein said seat upholstery is non-rotatably fixed on an arcuate seat frame connected to a pivotable supporting pole hinged to an upper straight section of said supporting beam and lockable in a selected seat position; and
at least one supporting leg introducing the weight forces applied by the sitting operator into the floor is provided on an approximately horizontal section of said supporting beam.

24. The supporting structure according to claim 23, wherein said supporting pole has adjusting means and the length of said supporting pole is adjustable.

25. The supporting structure according to claim 23, wherein said supporting leg is displaceable from a stand-by position to an active supporting position by applying a load to said seat upholstery.

26. A supporting structure which is adapted to be mounted to a machine tool and which supports a console thereon, the supporting structure comprising:
a bending-resistant supporting beam having a proximal end and a distal end, said supporting beam being pivotably mountable on one side of the machine tool via a joint, said supporting beam carrying the console which comprises a keyboard and a display unit on said distal end of said supporting beam which is upwardly inclined;
wherein said joint comprises a bearing arrangement comprising a first bearing and a second bearing and being mechanically couplable between the machine tool and the proximal end of said supporting beam; and
a seat structure for an operator coupled to said supporting beam, wherein said seat structure comprises a seat upholstery, adjusting means and locking mechanism, whereby the seat upholstery is adjustable to and lockable in various positions and wherein said seat upholstery is non-rotatably fixed on an arcuate seat frame connected to a pivotable supporting pole hinged to an upper straight section of said supporting beam and lockable in a selected seat position.

27. The supporting structure according to claim 26, wherein said bearing arrangement has two joints and comprises a first bearing and a second bearing having a torsion spring element and a locking mechanism, said seat upholstery being coupled to said bearing arrangement via said supporting pole so that said locking mechanism in said bearing arrangement is released in case of a load acting on said seat upholstery.

28. A supporting structure adapted to be mounted to a machine tool, the supporting structure comprising:
a bending-resistant supporting beam formed as a hollow profile and having a proximal end and a distal end, said proximal end being configured to be pivotably mountable on one side of the machine tool via a joint;
a console comprising a keyboard and a display unit coupled on the distal end of an upwardly inclined section of said supporting beam; and
a seat structure for an operator coupled to said supporting beam, said seat structure comprising a seat upholstery, adjusting means and locking mechanism, whereby the seat upholstery is adjustable to and lockable in various positions; and
wherein said seat upholstery is non-rotatably fixed on an arcuate seat frame connected to a pivotable supporting pole hinged to an upper straight section of said supporting beam and lockable in a selected seat position.

29. The supporting structure according to claim 28, wherein said supporting pole has adjusting means and the length of said supporting pole is adjustable.

30. The supporting structure according to claim 28, wherein said supporting beam has a rounded cross-section and comprises longitudinally continuous stiffening fins as well as at least one covered cable passage provided in its interior.

* * * * *